US008750291B2

(12) United States Patent
Balasaygun et al.

(10) Patent No.: US 8,750,291 B2
(45) Date of Patent: Jun. 10, 2014

(54) ENHANCED CALL PRESERVATION TECHNIQUES FOR SIP-BASED COMMUNICATION NETWORKS

(75) Inventors: Mehmet C. Balasaygun, Freehold, NJ (US); Gordon R. Brunson, Broomfield, CO (US); Harsh V. Mendiratta, Old Bridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 499 days.

(21) Appl. No.: 12/623,430

(22) Filed: Nov. 22, 2009

(65) Prior Publication Data

US 2011/0122863 A1     May 26, 2011

(51) Int. Cl.
| *H04L 12/66* | (2006.01) |
| *H04M 15/00* | (2006.01) |
| *H04L 29/06* | (2006.01) |
| *H04W 28/04* | (2009.01) |
| *H04M 7/00* | (2006.01) |
| *H04W 72/04* | (2009.01) |
| *H04W 76/04* | (2009.01) |

(52) U.S. Cl.
CPC .......... *H04L 65/1046* (2013.01); *H04M 15/00* (2013.01); *H04M 15/63* (2013.01); *H04W 28/04* (2013.01); *H04M 7/0084* (2013.01); *H04M 7/006* (2013.01); *H04W 72/04* (2013.01); *H04L 65/105* (2013.01); *H04M 15/8228* (2013.01); *H04L 65/80* (2013.01); *H04L 65/1083* (2013.01); *H04W 76/04* (2013.01); *H04L 65/1006* (2013.01)
USPC ........................................................ 370/352

(58) Field of Classification Search
None
See application file for complete search history.

(56) References Cited

U.S. PATENT DOCUMENTS

| 7,315,554 | B2 | 1/2008 | Baum et al. | |
|---|---|---|---|---|
| 2006/0031369 | A1 | 2/2006 | Caron et al. | |
| 2006/0111099 | A1* | 5/2006 | Abdel-Kader | 455/421 |
| 2006/0146798 | A1* | 7/2006 | Harton et al. | 370/352 |
| 2006/0239243 | A1* | 10/2006 | Li | 370/352 |
| 2007/0203983 | A1 | 8/2007 | Fukuhara et al. | |
| 2007/0217589 | A1* | 9/2007 | Martin et al. | 379/202.01 |
| 2008/0013447 | A1* | 1/2008 | Lauber | 370/225 |
| 2008/0095173 | A1* | 4/2008 | Bugenhagen | 370/395.21 |
| 2008/0098117 | A1* | 4/2008 | Fukuhara et al. | 709/227 |
| 2008/0225835 | A1* | 9/2008 | Oda et al. | 370/352 |
| 2011/0264808 | A1* | 10/2011 | Eriksson | 709/227 |

OTHER PUBLICATIONS

Rosenberg et al., "SIP: Session Initiation Protocol", RFC 3261, available at www.ietf.org/rfc/rfc3261.txt, Jun. 2002, 252 pages.
Rosenberg et al., "An Offer/Answer Model with the Session Description Protocol (SDP)", RFC 3264, available at www.ietf.org/rfc/rfc3264.txt, Jun. 2002, 24 pages.
Donovan et al., "Session Timers in the Session Initiation Protocol (SIP)", RFC 4028, available at www.ietf.org/rfc3264.txt, Apr. 2005, 26 pages.

* cited by examiner

*Primary Examiner* — Yong Zhou
(74) *Attorney, Agent, or Firm* — Sheridan Ross P.C.

(57) ABSTRACT

Methods, devices, and systems are provided for preserving connections, especially in a SIP environment. More specifically, the connection preservation techniques presented in this document enhance the RFC 4028-based session refresh approach in order to provide media connection preservation for calls that experience end-to-end signaling loss or refresh failures. Specifically, participants on a call can continue to exchange media despite the loss of control at the SIP signaling plane.

20 Claims, 11 Drawing Sheets

ENHANCED CALL PRESERVATION TECHNIQUES FOR SIP-BASED COMMUNICATION NETWORKS

FIELD OF THE INVENTION

The invention relates generally to communications and more specifically to connection preservation.

BACKGROUND

Voice over Internet Protocol (VoIP) is a general term for a family of transmission technologies used to deliver voice communications over IP networks such as the Internet or other packet-switched networks. Other terms frequently encountered and synonymous with VoIP are IP telephony, Internet telephony, voice over broadband (VoBB), broadband telephony, and broadband phone.

Internet telephony refers to communications services—voice, facsimile, and/or voice-messaging applications—that are transported via the Internet, rather than the public switched telephone network (PSTN). The basic steps involved in originating an Internet telephone call include conversion of the analog voice signal to digital format and translation of the signal into Internet protocol (IP) packets for transmission over the Internet; the process is reversed at the receiving end.

VoIP systems employ session control protocols, such as the Session Initiation Protocol (SIP), to control the set-up and tear-down of calls as well as audio codecs which encode speech allowing transmission over an IP network as digital audio via an audio stream. The advantage to VoIP is that a single network can be utilized to transmit data packets as well as voice and video packets between users, thereby greatly simplifying communications.

SIP is an open signaling protocol for establishing many kinds of real-time and near-real-time communication sessions, which may also be referred to as dialogs. Examples of the types of communication sessions that may be established using SIP include voice, video, and/or instant messaging. These communication sessions may be carried out on any type of communication device such as a personal computer, laptop computer, telephone, cellular phone, Personal Digital Assistant, etc. One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

IETF SIP standards, specifically, RFC 4028 describes a SIP signaling session refresh technique for monitoring the health of an established call session. The technique described in RFC 4028 requires SIP signaling peers to exchange periodic SIP in-dialog INVITE or UPDATE messages to check and extend the status of the SIP dialog. However, it makes a simplifying recommendation by tying the status of the media connection to the status of the SIP dialog. Specifically, if the SIP dialog refresh times out or fails (by receipt of a non 2xx final response message), the media associated with the SIP dialog is automatically terminated. While this approach may be desirable behavior for example, to prevent billing errors, it results in immediate media loss, which is undesirable in many circumstances. Since the path of SIP Signaling often does not follow the same path as the connection media, it is possible to preserve the media connection even though the end-to-end SIP signaling connection has been disrupted.

SUMMARY

It is, therefore, one aspect of the present invention to provide intelligent mechanisms for preserving connections, particularly in a SIP environment. The techniques described herein enhance the RFC 4028-based session refresh approach to provide media connection preservation for calls that have experienced an end-to-end signaling loss or refresh failure.

In accordance with at least some embodiments of the present invention, from the perspective of connection preservation behavior, SIP network elements can be viewed as operating in one of the following modes: (1) SIP User Agent (UA) that generates and/or receives media; (2) SIP Back-to-Back User Agent (B2BUA) that does not terminate/relay media; (3) SIP B2BUA that terminates and relays media; and (4) Stateful Proxy. It is not necessary for a single entity to implement SIP UA and media terminations together. For example, it is likely that for a video call, SIP UA, audio channel, and video channel reside on three separate devices (e.g., SIP UA can be on a PC, audio channel terminates on a physical phone, and video channel terminates on a conference screen).

In accordance with at least some embodiments of the present invention, different SIP network elements, servers and endpoints, may go in and out of some or all these modes over time, based on the type of services they provide. The examples discussed herein illustrate how some network elements may stay in a single mode, whereas some other elements dynamically move between different modes depending on the state of the call.

In accordance with at least one embodiment of the present invention, enduser devices (e.g., telephones, mobile clients, soft client applications, etc.) generally operate as SIP UAs, providing audio and/or video call services to their end users. The devices stay in the UA mode providing 2-party calls, or conference calls, and generally do not transition to the B2BUA modes of operation.

In accordance with at least some embodiments of the present invention, conferencing servers usually stay in the UA mode, providing service to conference calls with N-call legs.

In accordance with at least some embodiments of the present invention, a messaging server stays in the UA mode, providing service for 2-party or multi-party call sessions.

Certain types of servers that are adapted to operate as an application or feature server may first start in the UA mode during the initial stage of a call. Once the call is initiated, this server sets up an additional call leg to the recipient of the call to finish the establishment of a call session and hence moves into one of the two B2BUA modes listed above. Specifically, depending on whether the B2BUA terminates (and re-generates) media for the related SIP session or not, the server may move into in either "B2BUA with media" mode or "B2BUA with no media" mode, respectively. When, one of the call parties adds a third party to create an ad hoc conference call, the server may then move into UA mode, providing service to N-call legs of the conference call. At this point, the server may shuffle the media back to a media gateway's resources that it controls, to provide media services to its conference call legs.

In accordance with at least some embodiments of the present invention, a method of managing a SIP call between two or more network elements is provided that generally comprises:

determining that a signaling-disrupting event has occurred during the SIP call; and causing the call to enter a connection preserved state, wherein media resources assigned to the SIP call support communications between the two or more network elements and wherein the media resources continue to be assigned to the SIP call while the SIP call is in a connection preserved state even though the signaling-disrupting event has occurred.

In some embodiments the signaling-disrupting event comprises one or more of the following: (i) losing SIP signaling between the two or more network elements; (ii) a SIP session refresh interval expiring without completion of a successful refresh; and (iii) receiving a 481 response for an in-dialog SIP transaction.

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module", "agent", or "tool" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of embodiments of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database (s), the invention is not limited to use with any particular type of communication system or configuration of system elements. Those skilled in the art will recognize that the disclosed techniques may be used in any communication application in which it is desirable to provide call preservation features.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Although certain embodiments of the present invention will be discussed in connection with two media subsystems, one skilled in the art will appreciate that the present invention is not so limited. For example, a system of device employing embodiments of the present invention may utilize any number of media subsystems and with any number of media channels within each of those media subsystems.

Figure 1:
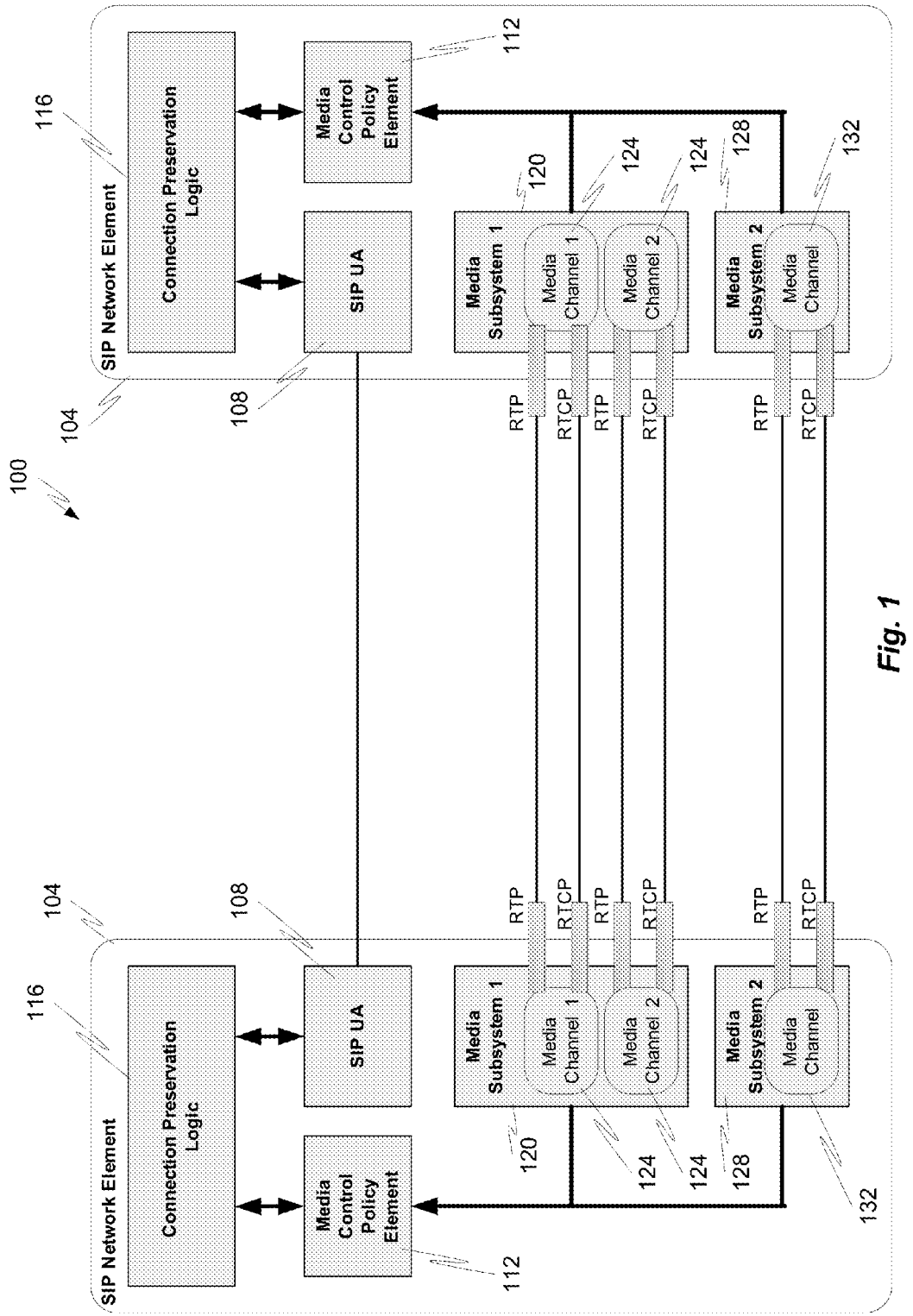
FIG. 1 is a block diagram depicting a communication system in accordance with at least some embodiments of the present invention.

With reference initially to FIG. 1, an exemplary communication system 100 will be described in accordance with at least some embodiments of the present invention. More specifically, the communication system 100 may comprise a plurality of communication device in communication with one another using a number of possibly different communication modalities. More specifically, the communication system 100 may comprise two or more network elements 104 in communication with one another via an established communication link.

In accordance with at least some embodiments of the present invention, the network elements 104 may include, but are not limited to, end-user devices (e.g., phones, cell phones, mobile communication devices, soft-client applications running on a Personal Computer (PC) or similar type of work station and connected to a phone, etc.) and applications running on a server or the like (e.g., conferencing application(s) running on a conferencing server, messaging application(s) running on a messaging server, voice portal, etc.). While certain embodiments of the present invention will be discussed in connection with exemplary network elements, one skilled in the art will appreciate that embodiments of the present invention are not so limited.

One or both network elements 104 may include a SIP UA 108 or similar functionality, media control policy elements or modules 112, connection preservation logic 116, two media subsystems 120 and 128. In some embodiments, one of the media subsystems (e.g., the second media subsystem 128) may be provided outside the SIP Network Element 104. For example, there may be system configurations where the SIP UA 108 is provided in one device and the media server is provided in another device, meaning that the mechanisms described herein for connection preservation apply for both the co-resident case and the remote media server case because of the state machine developed. Furthermore, the network element 104 may be realized using one or more physical elements. That is, elements 108, 116, 112, 120, and 128 need not be in a single physical element or device.

In accordance with at least some embodiments of the present invention, one or more of the SIP UA 108, media control policy elements or modules 112, and connection preservation logic 116 may be stored as instructions in memory of the network element 104. The network element 104 may also include a processor for executing the instructions stored in memory, thereby performing the functions provided by the SIP UA 108, media control policy elements 112, and/or connection preservation logic 116.

In accordance with at least some embodiments of the present invention, the media control policy element 112 may be a component of the network element 104 that collects media channel status information from media subsystem(s) 120, 128, and decides upon when the media session failure should be declared, or when such declaration should be removed. In other words, it is the responsibility of media control policy element 112 to decide on whether a media session has failed or not. The rules for collecting media status reports from media subsystems 120, 128 and for coming up with media session failure are application/device dependent.

It should be noted that the media control policy element 112 is capable of producing All Media Channels Failed (AMC_F) events and All Media Channels OK (AMC_OK) events that summarize status of a media session based on the priorities assigned to the media channel(s) 124, 128 of the media session, and the policy engine implemented by the media control policy element 112. For example, the policy may require that the media control policy element declare the failure of the entire media when the media channel 128 fails, regardless of whether the media channel(s) 124 are healthy or not. Similarly, another policy may give equal importance to all media channels, 124 and 128 and hence may not declare the failure of the entire media session when the media channel 128 fails. It should also be noted that the policy programmed into a media control policy element is not a static, hard-coded policy. The policy executed by the media control policy element can be altered and re-programmed at any time during the lifetime of the system, 104.

The SIP UA 108 is the component of the SIP network element 104 that facilitates UA behavior and implements SIP call control features on behalf of the SIP network element 104. The accordance with at least some embodiments of the present invention, the SIP UA 108 is the component of the network element 104 that is capable of exchanging (e.g., generating, receiving, and/or processing) SIP messages with other network elements. Exemplary SIP messages that may be generated, received, and/or processed by the SIP UA 108 include, without limitation, INVITE, ACK, OK, BYE, and any other known SIP message, such as those described in IETF RFC 3261, the entire contents of which are hereby incorporated herein by reference and such other IETF RFC's that extend the message functionality of SIP.

The connection preservation logic 116 provides the higher-level processing needed to reconcile the operations of the SIP UA 108 and media control policy element 112. In accordance with at least some embodiments of the present invention, the connection preservation logic 116 is used as a mechanism by which the SIP UA 108 and media control policy element 112 exchange messages. As can be appreciated by one skilled in the art, the connection preservation logic 116 may be incorporated into one or both of the media control policy element 112 and SIP UA 108 in which case the two components may be adapted to communicate directly with one another.

Media channels 124, 132 contained within the media subsystems 120, 128, respectively, may be used to facilitate the physical media and/or control connections between network elements 104. In accordance with at least some embodiments of the present invention, the media channels 124, 132 may be adapted to support any type of Real-time Transport Protocol (RTP) media exchange or Real-time Transport Control Protocol (RTCP) message exchange. Accordingly, the media channels 124, 132 may be one or more of an audio channel, video channel, Instant Message channel, data sharing channel, etc. A first media subsystem 120 may be adapted to operate as a primary media subsystem while a second media subsystem 128 may be adapted to operate as a backup media subsystem, providing redundancy in the event that the primary media subsystem fails. Alternatively, the first media subsystem may provide support for one type of media such as audio, while a second subsystem may be more able to support the demands of high definition video media. Thus, the distinction of primary and secondary/backup media systems with respect to the first and second media subsystems 120, 128 is not necessary. The Media Control Policy Element 112 is responsible for aggregating the state of all media subsystems associated with the SIP UA 108.

The media subsystems 120, 128 may include a software module that acts as the termination point for one or more media channels 124, 132. For example, one media subsystem may be responsible for an audio channel, providing the support for bi-directional VoIP session. Another media subsystem may be responsible for both audio and video channels, providing support for a multi-media VoIP session.

Each subsystem 120, 128 may be adapted to monitor the connection status of each of its channels 124, 128 and report such status information to the media control policy element 112. This enables the media control policy element 112 to detect AMC_F and AMC_OK conditions.

In accordance with at least some embodiments of the present invention, each media subsystem 120, 128 can detect a single Media Channel Failed (MC_F) condition and/or a single Media Channel OK (MC_OK) condition. The MC_F condition is defined to reflect an outage of a single media channel which may occur anytime, regardless of the state of SIP signaling. For a multi-media session with, for example, audio and video channels, media monitoring on each channel is done independent from one other.

MC_F refers to one or more of the following conditions listed below. Because certain older media implementations are not capable of exchanging RTCP reports, there are two conditions to be considered. It should be noted that once RTCP is successfully exchanged over a media channel, it is assumed that RTCP is available throughout the session, and the outage indicates media outage.

The first condition to be considered is if RTCP is exchanged when the call is healthy, then the MC_F is declared if there is either: (a) persistent lack of RTCP receipt from the peer during T, where T refers to a specified sliding time interval, which can be around about 60 seconds, but can vary according to user preferences or (b) persistent receipt of ICMP port unreachable messages from the far end media module in response of transmitted RTCP packets during T.

The second condition to be considered is if RTCP is not exchanged, then the operation of the RTP streams is considered to determine that an MC_F condition exists as follows: (a) persistent lack of RTP receipt during T, for a media connection where RTP packet receipt has been previously negotiated. Examples are when bi-directional or unidirectional receive-only media exchange has been negotiated and (b) persistent receipt of ICMP Port Unreachable responses from the far-end media peer for the RTP messages sent to the peer for the duration T. This condition is expected when a media module has terminated the call.

It is possible that in the absence of RTCP exchange, the MC_F definition from above may result in false positives. Specifically, silence suppression or muting at the media peer may result in the lack of receipt of RTP packets. While most audio codec implementations send silence packets, this cannot always be relied on as this behavior is dependent on the specifics of a codec's definition. In addition, video muting may not result in the generation of "silence" packets. Therefore there are cases that may result in false media loss declarations because the lack of receipt of RTP packets may last longer than T during sunny day scenarios. There is no easy way of dealing with these conditions. For example, increasing the value of T to lessen the probability of false positives in the absence of RTCP exchange is one possibility. Unfortunately, this approach alone cannot completely eliminate the issue. It is, therefore, concluded that most modern RTP-based media over IP implementations include RTCP message exchange, and the chances of having a non-compliant implementation is small enough that the false positive issue does not need to be addressed.

MC_OK, on the other hand, is an event reported by a media subsystem 120, 128 to the media control policy element 112 to indicate that the media channel associated with the media subsystem is no longer experiencing media channel failure, as described in the MC_F definition.

When MC_OK is received at the media control policy element 112 from a media subsystem 120, 128 while the corresponding media channel is in failure state, the media channel status is immediately changed to normal state.

It is up to the media subsystem implementation as to how often MC_OK is reported. In one implementation, MC_OK may only be reported when the state of the media channel changes from failure to normal state. In another implementation, MC_OK may be periodically reported by the media subsystem to inform that the media channel status continues to be normal.

It should be noted that a media channel is considered to be in "normal" state while a Media Loss Detection (MLD) Timer used to calculate T is running.

As used herein, the term media session is understood to include a collection of one or more media channels associated with a call. Media session may consist of a single media channel (e.g., audio call), or multiple channels (e.g., audio and video call). This is an umbrella term and should not be confused with the events AMC_F and AMC_OK, which are produced by the media control policy element 112.

In accordance with at least some embodiments of the present invention, the media control policy element 112 may be adapted to produce AMC_F and AMC_OK events that summarize the status of a media session based on the priorities assigned to the media channel(s) of the media session. As a first example, a media control policy element 112 may give equal "priority" to any media channel associated with a call and declare the media session as failed when media loss is detected on all media channels. Specifically, a multimedia session with audio and video channels is declared as failed when media loss is detected on both the audio and the video channels. As a second example, a media control policy element 112 may give higher priority to one or more media channels than others. Specifically, for a multi media session consisting of audio, video and data sharing channels, the media control policy element 112 may declare the media session as failed when media loss is detected on both the audio and the data sharing channels. In other words, media loss at the video channel does not affect the state of the media session. Similarly, media loss at {audio, video} and {data sharing, video} do not constitute media session failure. However, in this example, media loss at {audio, data sharing} is considered as media failure. Other priorities and combinations can be assigned based on administrative or user preferences.

Figure 2:
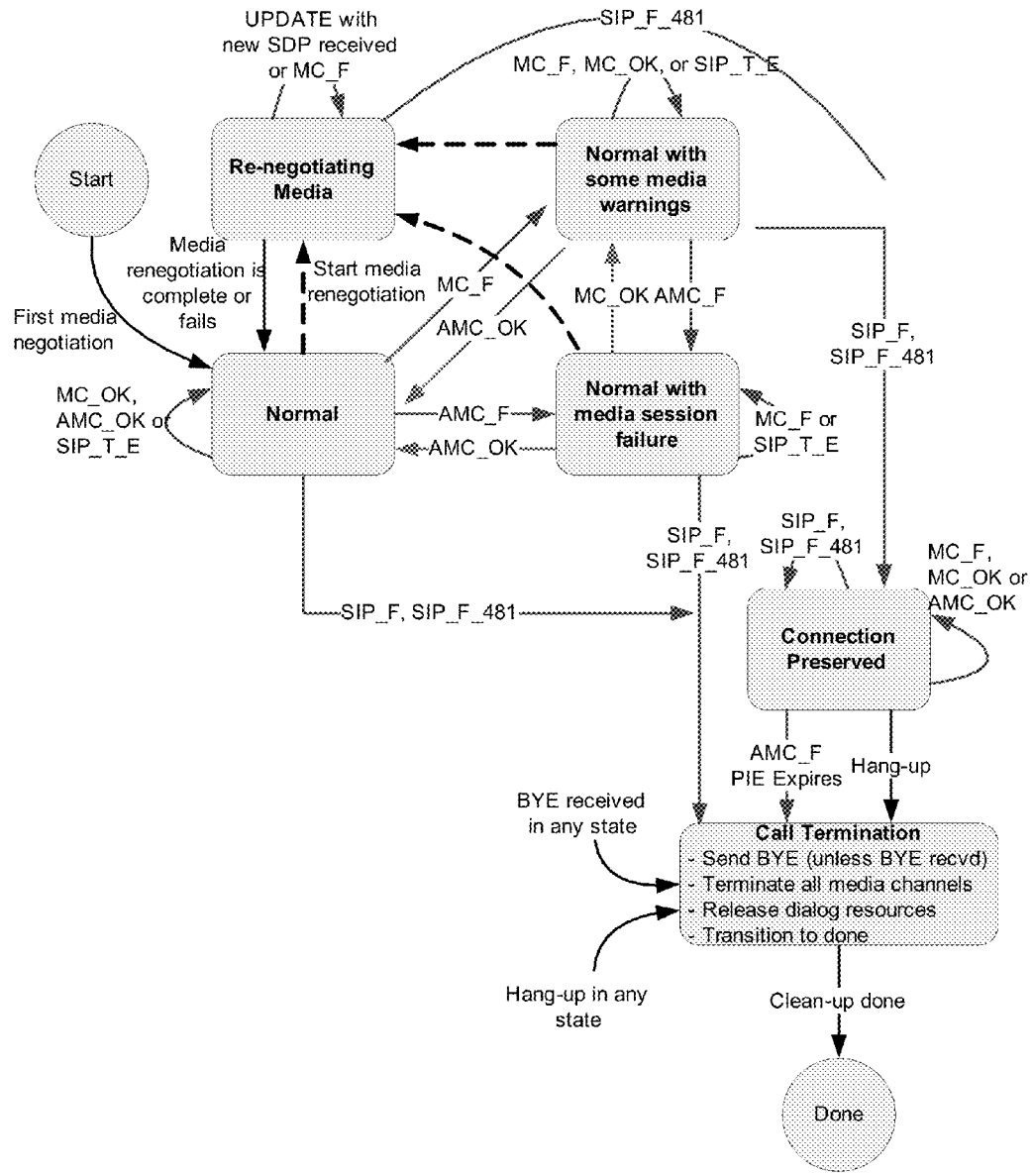
FIG. 2 is a state transition diagram depicting an exemplary call preservation operation in accordance with at least some embodiments of the present invention.

Referring now to FIG. 2, an exemplary state transition diagram utilized by the media control policy element 112 will be described in accordance with at least some embodiments of the present invention. The proposed media connection preservation technique for SIP UAs takes into account the status of the media channels 124, 132 and the status of the SIP dialog. The combined status information of media and signaling channels is used together to come up with a UA behavior that describes when and how long a connection should be preserved. The connection preservation of the UA can be described in terms of a state machine which combines media and signaling status information together. FIG. 2 depicts the recommended state transition diagram for SIP UAs.

Six main states can be provided and maintained by the Connection Preservation Logic 116 which are: "Re-negotiating Media", "Normal", "Normal with some media warnings", "Normal with media session failure", "Connection Preserved", and "Call Termination". The "Start, and the "End" are non-primary states, which are shown to reflect the beginning and the end of a SIP dialog as the dialog goes through different transitions during its lifecycle. The labels used for the main states primarily reflect the state of the SIP dialog:

"Re-negotiating Media" indicates that an early or mid-dialog media-affecting signaling re-negotiation is in effect.

"Normal", "Normal with some media warnings" and "Normal with media session failure" are all normal SIP dialog states where the SIP dialog is considered to be healthy, but media can be in healthy, semi-healthy, or failed state, respectively.

"Connection Preserved" is the state where the SIP signaling has been lost, but the media over one or more media channel(s) continues to flow successfully.

"Call Termination" is the state where the SIP dialog is terminated and the resources associated with the dialog is cleaned up.

As explained in the subsequent sections, the end-user devices that are controlled by a human and applications (automatons) follow the same state transaction diagram shown in FIG. 2. All six states are applicable to both end-user devices and automatons. However, due to the differences in how the devices and applications are invoked and used, the triggers for certain state transitions are different. Specifically, the transition from "Connection Preserved" state to "Call Termination" state is different: For end-user devices, the user's hang-up action controls this transition, whereas for automatons, the media session failure or a Preservation Interval Expired (PIE) timer expiry controls this transition. The PIE timer is generally a long safety-net timer that is started by a UA for a SIP dialog for which the SIP refresh mechanism failed or timed out. Upon expiry of this timer, the UA attempts to send a SIP BYE message, and cleans the local resources (e.g., media channels and/or subsystems) associated with the SIP dialog.

This timer is not used in an end-user device that is controlled by a human, as it is the physical "hang-up" action that initiates clean-up by stopping all media. Similarly, an application that guarantees "hang-up" by some mechanism independent of SIP signaling need not to implement a separate PIE timer.

One exemplary predetermined value that can be used by the PIE timer is about 2 hours, but this value can vary according to user and administrator needs. An application might choose to set it differently when the service offered is known to be shorter (or longer) than this interval. For example, an announcement service with a maximum announcement length of 5 minutes may have a PIE timer set for 5 minutes.

It should be noted that the "First Media Negotiation" transition from Start to Normal state occurs when the signaling dialog is successfully established, and the offer/answer capabilities information has been obtained. If the media does not flow (i.e., the associated media channel[s] do not start successfully), the connection preservation state then transitions to "Normal with some media warnings" or "Normal with media session failure" state. Subsequent re-negotiations are usually triggered either locally (i.e., initiated by one of the UAs 108), or when an UPDATE or in-dialog INVITE with Session Description Protocol (SDP) information is received.

The transition from the "Re-negotiating Media" state to the "Normal" state usually occurs in instances when a 481 message is not received. When a 481 message is received, the dialog transitions to the "Connection Preserved" state. In all other instances, a media channel 124, 132 is re-initialized and timer T is reset. This guarantees that any MC_F detected in "Re-negotiating Media" state will not be lost. The media renegotiation event is depicted in FIG. 2 as the dotted arrows originating at either the "Normal", "Normal with media session failure", or "Normal with some media warnings" state and terminating at the "Re-negotiating Media" state. The instance where the "Re-negotiating Media" state transitions back to itself usually occurs during a SIP early-dialog negotiation. SIP early-dialog is a type of a SIP dialog whose initial INVITE transaction has not been completed yet (due to pending exchange of SIP final response—i.e., response code>=200—and an ACK message). In the absence of parallel forking, the requestor of an INVITE-based SIP session encounters a single SIP early dialog. In the presence of parallel forking, if the called party has more than one UA registered on behalf of the called party's AOR or if some downstream proxy forks the request to two or more UAs, the requestor sees, and should be able to handle, multiple provisional responses, and maintains multiple early SIP dialogs and multiple early media negotiations.

It should also be noted that a non-481 INVITE or UPDATE transaction failure is considered to be a temporary error. In this case, the state of the dialog is not changed from one of the three "Normal" states to the "Connection Preserved" state.

The other types of events leading to state changes depicted in FIG. 2, but not yet discussed include: (1) SIP_F_481—is an event whereby a 481 response is received for any in-dialog SIP transaction; (2) SIP_F—is an event whereby a SIP session refresh interval expires without completion of a successful refresh; (3) SIP_T_E—is an event whereby a SIP in-dialog transaction timeout or error occurs (e.g., >2xx response, except 481); and (4) SIP_OK—is an event whereby a SIP session is refreshed successfully.

It should also be noted that a "SIP Session Refresh" is a process wherein a SIP session is considered "refreshed" when an in-dialog INVITE or UPDATE transaction carrying Session-Expires header can be successfully completed. If the refresh completes successfully, both signaling peers (e.g., network elements 104) restart their refresh timers according to the last negotiated session interval. The refresh should generally only restart timers on the in-dialog INVITE or UPDATE requests, to ensure that the refresher and its signaling peer see similar refresh expiration times. A SIP session refresh is declared to have failed if it cannot be successfully refreshed during the last negotiated session refresh interval.

Additionally a 481 Refresh Transaction Failure occurs upon receipt of 481(Call/Transaction Does not Exist) final response to any in-dialog SIP transaction, including (re-)INVITE or UPDATE request as per RFC 4028, the entire contents of which are incorporated herein by reference. Upon receipt of 481, the SIP dialog is put in the connection preservation state.

Non-481 Refresh Transaction Failure or Timeout is an event that occurs due to receipt of non-481 error final response (i.e., response code>=300 but not equal to 481) for any mid-dialog transaction. Upon encountering this condition, the SIP dialog stays in "normal" signaling state. The dialog refresh may be attempted again one or more times, until one or more of the following conditions are satisfied:

a. The refresh interval expires,
b. The near-end sends a BYE (e.g., user hangs up the call),
c. BYE is received from far-end,
d. The refresh transaction is responded to by a 481 response.

In accordance with at least some embodiments of the present invention, when a SIP session refresh fails because the dialog cannot be successfully refreshed during the refresh interval, or when a mid-dialog transaction (including refresh transaction) receives a 481 response, the failed SIP session and the media session associated with the failed SIP session are preserved. This behavior is true regardless of the number and the type of media channels 124, 132 associated with the failed SIP session. The status of the media channel(s) 124, 132 does not affect when the SIP dialog is terminated. Specifically, a SIP session that is in normal or preserved state is terminated when one of the following conditions occurs:

a. Near-end human ends the call. In this case, the device attempts to send a BYE request as part of the local signaling and media resources cleanup, b. BYE is received from the far-end.

Figure 5:
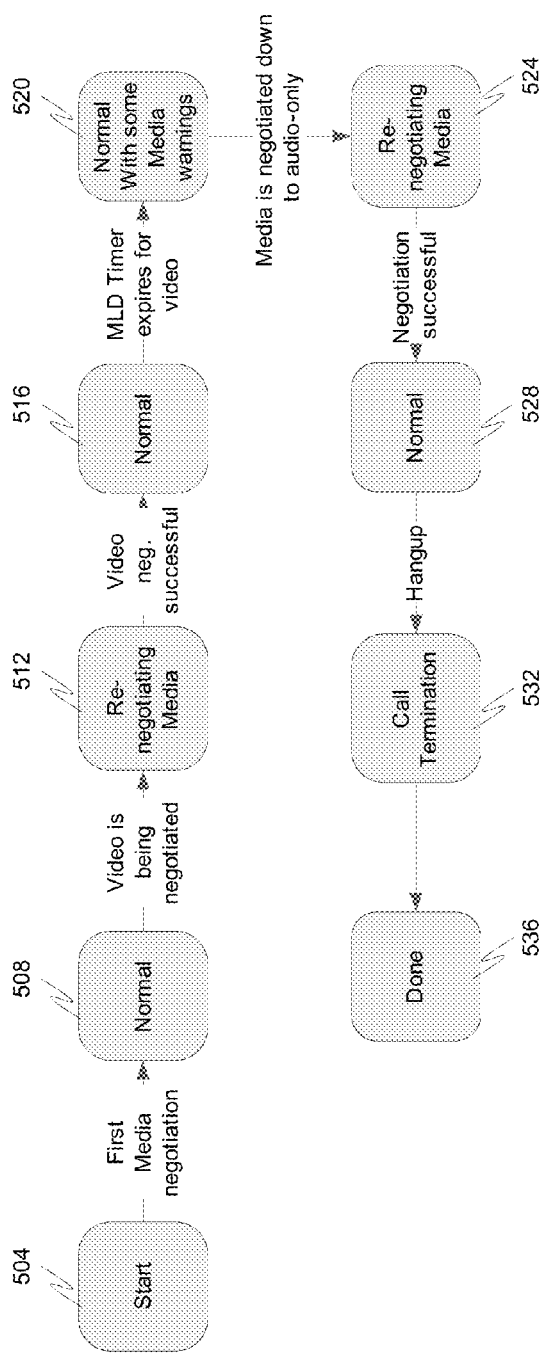
FIG. 5 is a flow diagram depicting state transitions at a calling party's endpoint for a multi-media session with media warning scenario in accordance with at least some embodiments of the present invention.
Figure 6:
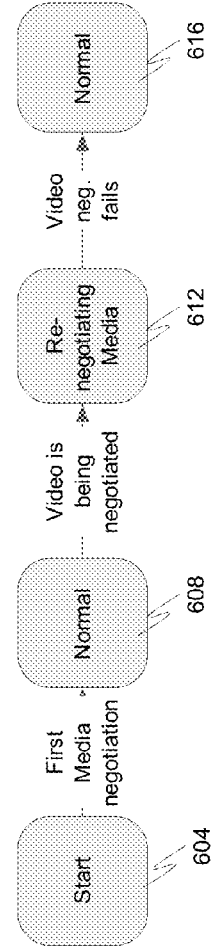
FIG. 6 is a flow diagram depicting state transitions at a calling party's endpoint for a re-negotiation timeout scenario in accordance with at least some embodiments of the present invention.
Figure 7:
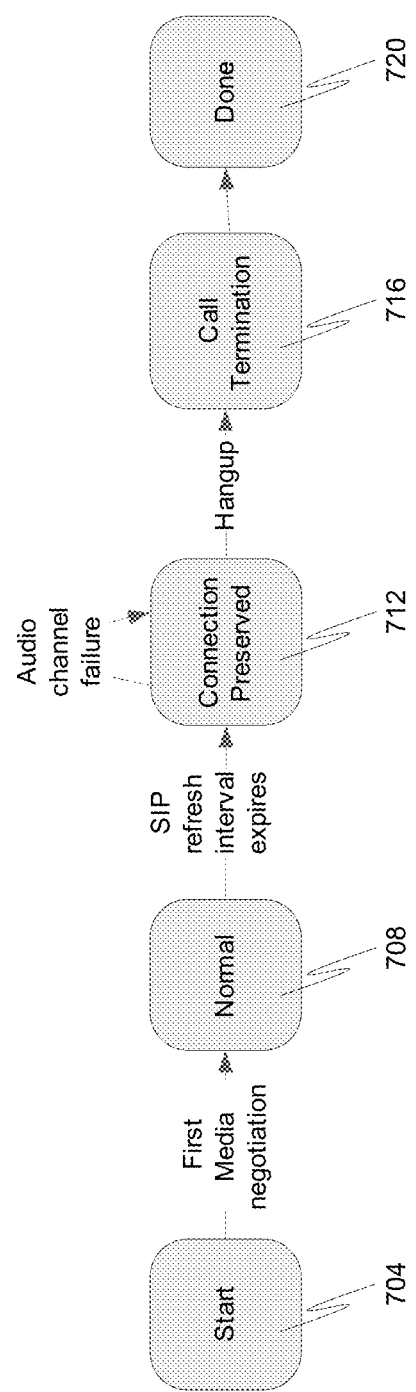
FIG. 7 is a flow diagram depicting state transitions at a calling party's endpoint for a preserved session scenario in accordance with at least some embodiments of the present invention.

The following examples depicted in FIGS. 3-7 show how a call, characterized by a SIP dialog and one or more media channels, owned by a human-controlled UA, goes through different state (as per the state transitions illustrated in FIG. 2) transitions under different sample scenarios. Although FIG. 7 depicts the only example that actually enters the connection preservation state, the other examples are illustrative of the completeness and robustness of the solution.

Figure 3:
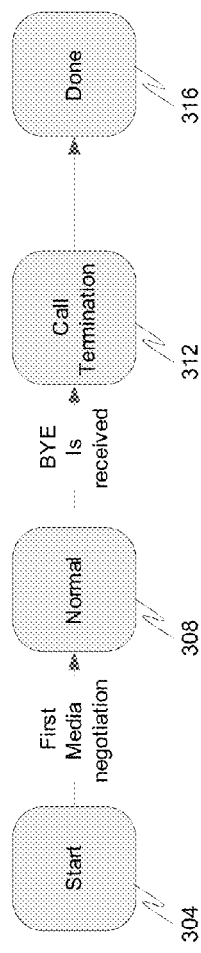
FIG. 3 is a flow diagram depicting state transitions at a calling party's endpoint for a normal call progress scenario in accordance with at least some embodiments of the present invention.

Referring initially to FIG. 3, a communication method is initiated at step 304 when a user goes off-hook and dials a number. The call rings at the far-end. The far-end answers the call, and the dialog is established (step 308). At some point between the initiation of the call and the establishment of the dialog a first media is negotiated between the network elements 104. This negotiation may occur automatically by virtue of the capabilities device that initiates the call or the capabilities of the device that received the call. If both devices are capable of supporting multiple media types, then the devices may exchange additional information to negotiate a media type(s) for use during the dialog. After some time, the far-end hangs up the call and the dialog is torn down (step 312) and the method is completed (step 316). It should be noted that the transition shown in FIG. 3 is independent of whether the call session is an audio-session or a multi-media session (e.g., audio and video), as per the recommendations in IETF SIP standards.

Figure 4:
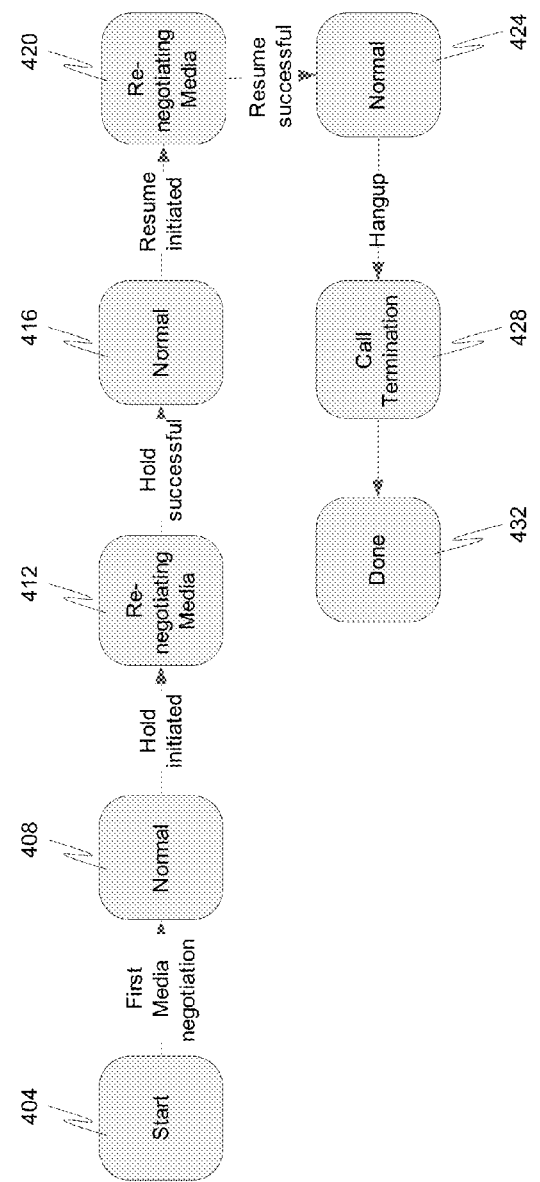
FIG. 4 is a flow diagram depicting state transitions at a calling party's endpoint for a normal media re-negotiation scenario in accordance with at least some embodiments of the present invention.

Referring now to FIG. 4, a normal media re-negotiation method will be discussed. Similar to the method depicted in FIG. 3, the method is initiated at step 404 when a user goes off-hook and dials a number. The call rings at the far-end. The far-end answers the call, and the dialog is established (step 408). After some time, the local user puts the call on hold, and then resumes the call at some point later. When the hold is initiated the media exchanged between the network elements 104 may be re-negotiated (step 412). If the hold is successful, then normal hold conditions are imposed on both network elements 104 (step 416). When the hold is taken off the communication session is resumed and the network elements 104 re-negotiate media (step 420). If this re-negotiation is also successful, then the dialog continues as normal (step 424). After a while the one of the users hangs up the call and the call is terminated (step 428) at which point the method ends (step 432).

FIG. 5 depicts a multi-media session with some media warning occurring. Similar to the method of FIGS. 3 and 4, the method is initiated at step 504 when a user goes off-hook and dials a number. The call rings at the far-end. The far-end answers the call. The call starts out as an audio-only call (step 508). Later, the parties agree to add video to the call and negotiate parameters of the same (step 512). The video negotiation is successful and the call continues as an audio/video call (step 516). After a while, the local user notices video disruption. The video disruption lasts long enough to trigger the MLD Timer expiry. The audio continues but with some media warnings (step 520). At some point later, one or both users decide to drop video off from the call, so the session is renegotiated (step 524). This triggers re-negotiation at the SIP level. When the re-negotiation is successful, the call continues as an audio-only call (step 528). Finally, user hangs up the call (step 532) and the method ends (step 536)

FIG. 6 depicts a method where the re-negotiation times out. The method begins in step 604 and continues when the user goes off-hook and dials a number. The call rings at the far-end. The far-end answers the call. At this point, this is an audio-only call (step 608). At some point later, the local user tries to add video to the call (step 612). However, the re-negotiation times out or errors (e.g., a non-481 response). However, the call continues as an audio call (step 616).

FIG. 7 depicts a method of entering a preserved call state. The method begins in step 704 and continues when a user goes off-hook and dials a number. The call rings at the far-end. The far-end answers the call, which is an audio-only call (step 708). The SIP refresh attempts all fail, and the session refresh interval expires. Shortly after the refresh interval expiry, user loses the audio connection. The connection, however, remains in a preserved state (step 712), meaning that the media subsystem(s) 120, 128 and/or media channel(s) 124, 132 are still reserved for the call, particularly in case there is an attempt to re-establish the call. The subsystems and/or channels are not released to be assigned to another call until the caller hangs up and finally terminates the call (step 16), thereby ending the method (step 720).

In accordance with at least some embodiments of the present invention, applications/automatons do not have a near-end human controlling the end of a SIP session, and therefore rely on the state of the media session to determine when to end a SIP session.

The following guidelines may be followed for connection preservation of an application/automaton:

1. If a call session with at least one healthy media channel (i.e., the session is in "Normal" or "Normal with some media warnings" state) encounters SIP Session Refresh Failure or 481 Refresh Transaction Failure, the application starts the PIE timer and puts the session in "connection preserved" state.

2. If a call session that has no healthy media channel encounters SIP Session Refresh Failure or 481 Refresh Transaction Failure, the application ends the session.

3. A session that is in "connection preserved" state is ended when one or more of the following events occur:
   a. AMC_F condition is met (i.e., Media Control Policy Element declares all media channels as failed).
   b. PIE Timer expires.
   c. BYE is received from the signaling peer.

A preserved session stays in the "connection preserved" state despite the occurrence of one or more of the following events: (1) Media loss is detected at one or more media channels, but the media session failure has not been declared by the Media Control Policy Element and (2) When a SIP dialog is in preserved state, UA initiates no outbound SIP request other than a BYE request to end the preserved dialog. In addition, the UA rejects almost any incoming in-dialog request or out-of-dialog request associated with the preserved dialog by a 481 response. However, the UA accepts: (i) an incoming in-dialog BYE request to end the preserved dialog and (ii) an incoming out-of-dialog dialog termination request (i.e., REFER with method=BYE) that identifies the preserved dialog as the target for termination.

4. If a call session that has no SIP signaling problems encounters failure of its entire media session (i.e., all media channels fail), the session is put in the "normal with media session failure" state. A session is kept in this state until one of the following events occurs:
   a. SIP Session Refresh Failure.
   b. A 481 response to an in-dialog SIP transaction.
   c. BYE is received from the signaling peer.

The call session may be put back in the "normal" or "normal with some media warnings" state if one or more of the media channels become healthy, and the media control policy element 112 no longer considers the media session as failed.

For a call that is either in one of the normal states or the connection preserved state, the application/automaton takes the following steps to end the call: (a) End local media resources associated with the call; (b) Attempt to send a BYE; and (c) Upon completion of the BYE transaction (successfully or not), clean up the SIP dialog resources (e.g., media subsystems and/or channels) associated with or used by the call.

Figure 8:
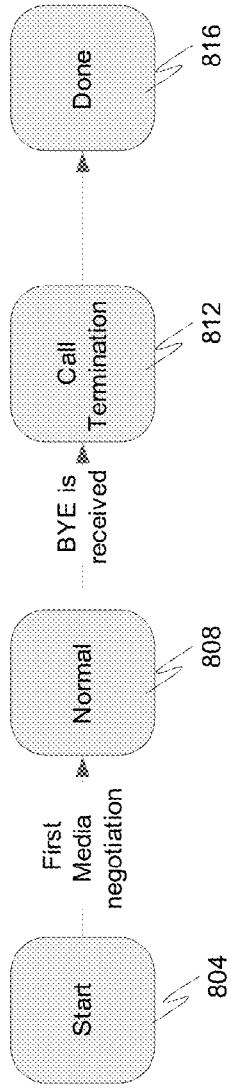
FIG. 8 is a flow diagram depicting state transitions for an automated endpoint for a normal call progress scenario in accordance with at least some embodiments of the present invention.
Figure 9:
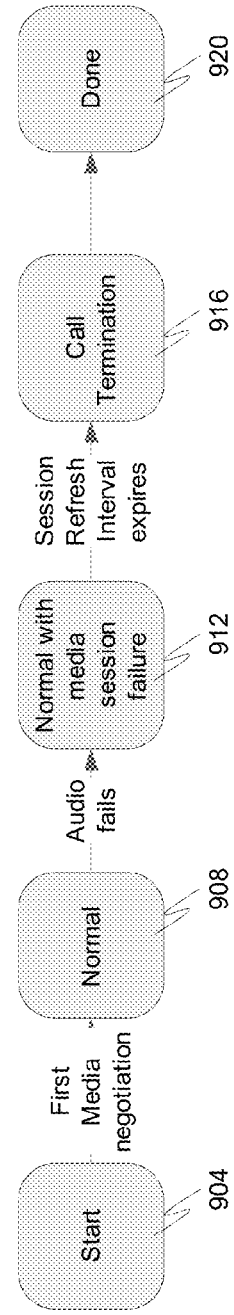
FIG. 9 is a flow diagram depicting state transitions for an automated endpoint for a normal with media failure scenario in accordance with at least some embodiments of the present invention.

The following examples depicted in FIGS. 8 and 9 show how a SIP dialog owned by an automaton goes through different transitions under different sample scenarios. Referring initially to FIG. 8, a general communication method starts at step 804 and continues when a voice messaging system, or some other automated application, answers a covered call (step 808). The incoming call is answered and the media session is negotiated between the calling user's device and the automated application. The calling user is then allowed to leave a message with the voice messaging system. Once the message has been left with the voice messaging system, the user hangs up the call, thereby terminating the session (step 812) and ending the method (step 816).

Referring now to FIG. 9, a method begins at step 904 and continues when a voice messaging system, or some other automated application, answers a covered call (step 908). While far-end is recording a message on the messaging system, there is audio disruption for more than 60 seconds, thereby causing the state to change from a normal state to a normal with some media warnings state (step 912). The voice messaging system's attempts to refresh the dialog time out, unsuccessfully, and the SIP refresh interval expires. This causes the call to be terminated (step 916), thereby ending the method (step 920).

It should be noted that in the scenario discussed with reference to FIG. 9, it is assumed that the voice messaging system is the dialog refresher and uses a 2 minute SIP refresh interval, which, according to RFC 4028, means that the dialog needs to be refreshed every minute. It is also assumed that the messaging system runs a 5-minute PIE timer. As can be appreciated by one skilled in the art, the amount of time counted by the PIE timer can vary according to user needs and preferences.

Figure 10:
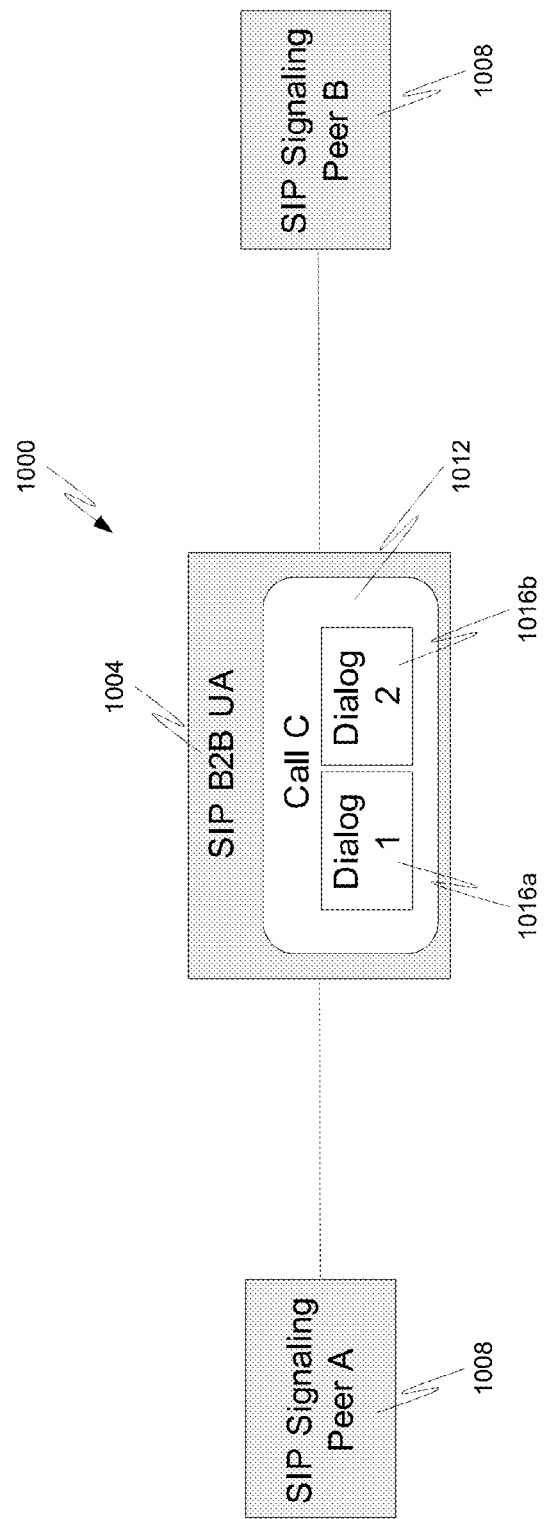
FIG. 10 is a block diagram of a B2BUA connecting to communication endpoints in a two-party call in accordance with at least some embodiments of the present invention.

Referring now to FIG. 10, a communication system 1000 including a B2BUA 1004 connecting two or more SIP signaling peers 1008. The SIP signaling peers 1008 may be similar to the network elements 104 depicted in FIG. 1 or may other B2BUAs in a chain of B2BUAs connecting network elements 104. The SIP B2BUA 1004 creates two SIP dialogs 1016a, 1016b to support SIP signaling for a 2-party call (or creates more dialogs if a larger party call is being supported). These two SIP dialogs 1016a, 1016b are also known as the call legs, and are associated with the signaling peers 1008 of the call. In this figure, the B2BUA 1004 does not terminate media associated with the call legs. The media between the two signaling peers 1008 may directly flow between one another, or may flow to other network elements not shown in the figure. From the connection preservation perspective, the two call legs cannot be treated independently from one another as the status of one call leg directly affects the status of the overall call and hence the other call leg.

It should be noted that there can be any number of sequenced applications, which are also known as B2BUAs, in the signaling between the shown B2BUA 1004 and the network elements 104 shown in FIG. 1. The actual implementation of these network elements 104 may vary. For example, either or both of the signaling peers 1008 may implement a SIP UA, SIP Stateful Proxy, or a B2BUA.

A SIP B2BUA 1004 that does not terminate media of a call 1012 cannot monitor the media status of the call legs associated with the call. Therefore, each of the two call legs of a call session can be in either of the following states shown in FIG. 2: {State A=Normal, State B=Re-negotiating Media, State C=Connection Preserved, and State D=Call Termination}. It should be noted that there is a single Normal state due to lack of media channel status information, and it reflects the status of the overall SIP session.

For 2-party calls, for which the B2BUA 1004 maintains two call legs, a single PIE Timer is used to preserve the entire call session. The PIE timer is started when one of the call legs is put in "preserved" state. Upon expiry of the PIE, both call legs are terminated as described below.

The overall state of the call is dependent on the state of its two call legs. Each call leg can be in {Normal [Normal with no media warnings, Normal with some media warnings, or Normal with media session failure], Re-negotiating Media, Connection Preserved, or Call Termination} state. Analysis of a call state would therefore require analysis of call states that the two call legs can assume. The state of the call legs can be put into a table form (call state table), each row of the table representing different states the Call Leg 1 can be in, and each column of the table representing different states the Call Leg 2 can be in. Since a state pair such {CL1=Normal, CL2=Reneg} is equivalent to the state pair {CL1=Re-neg, CL2=Normal}, there is diagonal symmetry in the call state table because the order of call legs in the state pairs is not important from the perspective of analyzing call preservation algorithm. A second simplification can be done for cells about the call termination. Once a call leg is terminated, the other call leg is terminated as well. Additional simplifications can be made to the state table by examining the specific scenario the states represent. Some states may be considered "transient" states because the overall call session is temporarily in this state, and is likely to move to a neighboring state. Specifically:

Where one call leg is in Re-negotiating state while the other call leg is in Normal state will result in transition to state B where both call legs are in Re-negotiating state, or to state A, the Normal state (when the re-negotiation is complete—successfully or not). Therefore, when one of the call legs is in Re-negotiating state, the entire call is considered to be in Re-negotiating state.

When a call leg is in Preserved state, the entire call is viewed to be in Preserved state. Specifically, where one call is in re-negotiation state while the other call leg is in Preserved state is unlikely to succeed because the effective re-negotiation through a B2BUA that does not terminate media will have to involve re-negotiation at both call legs.

Similarly, having a call leg in Normal state while the other one is in Preserved state is more likely to persist than the situations described above. However, the overall the preservation algorithm does not need to differentiate between these states because the overall call is effectively in a preserved state when one of the call legs is in Preserved state. The reasons for this are:

The PIE timer is started when one of the call leg experiences signaling failure.

The overall call is ended when one of the call legs is ended.

Incorporating all of these simplification points, the state transition table can be reduced, as shown in Table 1. The states shown in this table are also known as the primary states of a call session as transitions from neighboring states take the call session to one of the 4 primary states.

TABLE 1

Call States for 2-party call at a B2BUA

| CL1 | CL2 | | | |
|---|---|---|---|---|
| | Normal | Re-neg | Preserved | Call Term |
| Normal | A | | | |
| Re-neg | | B | | |
| Preserved | | | C | |
| Call Term | | | | D |

Embodiments of the present invention propose several recommendations based the states defined in Table 1, including one or more of:

1. When both call legs are in Normal state, if one of the call legs encounters Session Refresh Failure or 481 Refresh Transaction Failure, the B2BUA 1004 puts the call leg in Preserved state, and starts the PIE timer for the overall call. (State Transition: A to C.)

2. If one of the call legs is in Preserved state and the second call leg experiences Session Refresh Failure or 481 Refresh Transaction Failure, the second call leg is put in preserved state. PIE timer does not need to be started since it was started when the first call leg was put in "preserved" state. (State Transition: Stay in C.)

3. If re-negotiation of a call leg fails due to transaction timeout or non-481 SIP error, the media capability of the call leg continues with the last successfully negotiated capability. It is possible that this triggers unwinding of partial re-negotiation on the other call leg. The unwinding occurs by B2BUA 1004 sending an ACK message back to the offer with port number set to 0, as indicated in Section 6 of RFC 3264, the entire contents of which are hereby incorporated herein by reference. (State Transition: B to A.)

4. If re-negotiation of a call leg fails due to a 481 SIP transaction error, the media capability of the call leg continues with the last successfully negotiated capability. It is possible that this triggers unwinding of partial re-negotiation on the other call leg The unwinding occurs by B2BUA 1004 sending an ACK message back to the offer with port number set to 0, as indicated in Section 6 of RFC 3264. (State Transition: B to C.)

5. If a valid BYE request is received on either of the call legs, B2BUA 1004 cancels the PIE timer (if running), attempts to send a BYE on the other call leg, and cleans up the resources (e.g., media subsystems and/or channels) associated with the call when the BYE transaction completes. (State Transition: A/B/C to D.)

6. Any mid-dialog non-481 transaction failure or timeout does not cause transition of the call leg into the Preserved state. If the call leg is in the Normal state, it stays in the Normal state while the signaling software attempts its failure response on the call leg. If the call leg is in the Re-negotiating state, it transitions to the Normal state with the previously negotiated media capabilities. (State Transition: Stay in A, or B to A.)

7. If the PIE timer expires, B2BUA sends a BYE on both call legs, and cleans up the resources associated with the call when the BYE transactions complete.

(State Transition: C to D)

Figure 11:
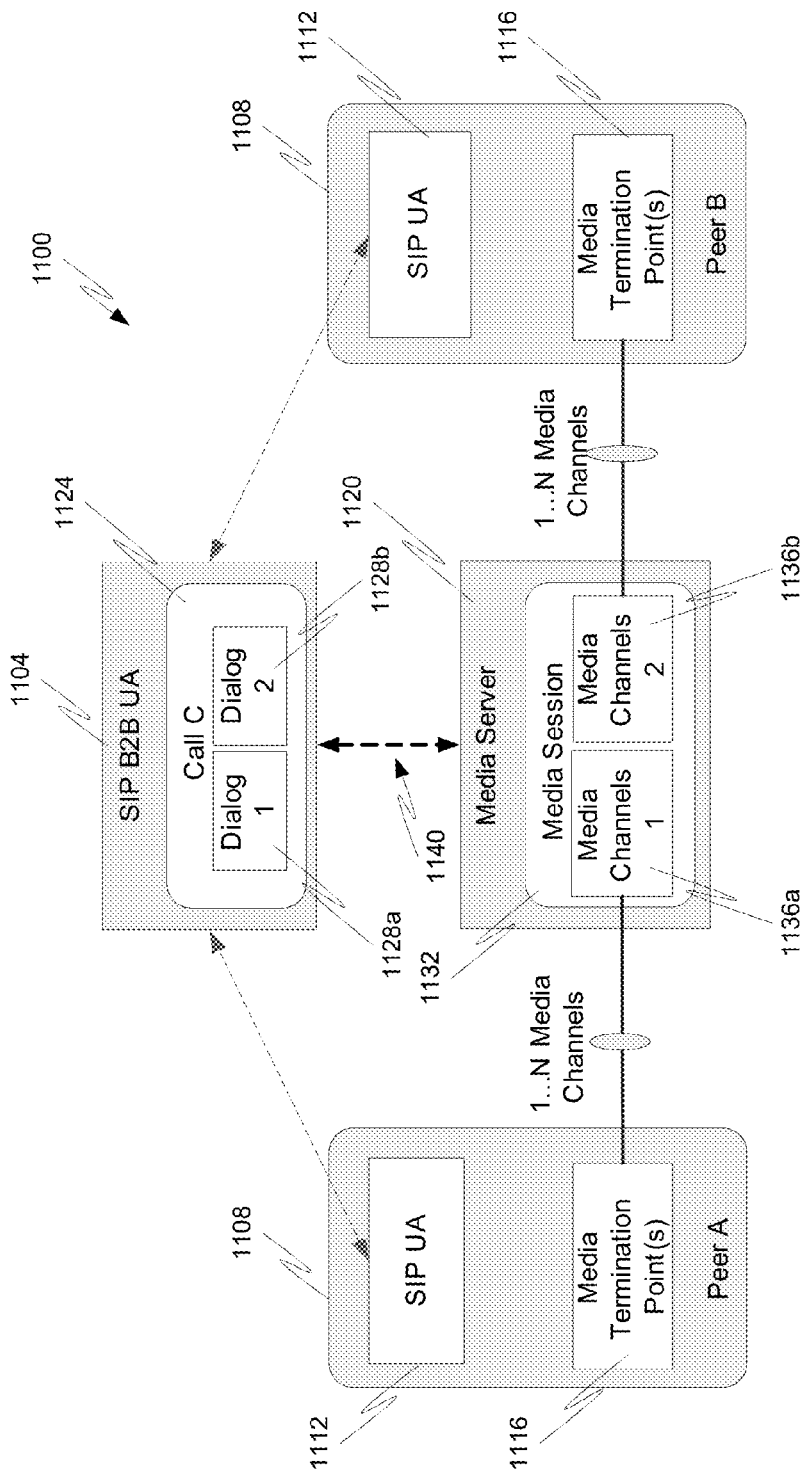
FIG. 11 is a block diagram of a B2BUA and media server connecting communication endpoints in a two-party call in accordance with at least some embodiments of the present invention.

Referring now to FIG. 11, a system 1100 having separate signaling and media flows is shown in accordance with at least some embodiments of the present invention. The signaling and media flows are controlled by a SIP B2BUA 1104 that is in the SIP signaling path of a call session between two signaling peers 1108. The B2BUA 1104 shown in the diagram is a media-controlling B2BUA 1104, which makes use of a media server's 1120 resources to provide media termination services for the call sessions 1124 it handles. The media server 1120 is depicted as a separate component, to show its distinct role in the solution design architecture. An actual deployment and instantiation of the media server may greatly vary. For example, the media server 1120 can be an integral piece of the network element that hosts the B2BUA 1104 (e.g., both components can reside in a common enclosure or be executed by a common server), or can be a distributed network component shared by different network elements. In either case, there is a control path between the B2BUA 1104 and the media server 1120 to control the media channel(s) 1136a, 1136b within a media session 1132 associated with a call session 1124.

The SIP B2BUA 1104 is shown to provide SIP signaling and control media services for two different signaling peers 1108, which may correspond to network elements 104. The peers 1108 each comprises of a SIP UA 1112 and media termination points 1116. The SIP UA 1112 provides the functionality to support SIP signaling whereas the media termination point 1116 provides the mechanisms for receiving and sending media data (e.g., audio/video/data) to the peer 1108, via the media server 1120.

The call control implemented by the B2BUA 1104 may be similar to the B2BUA 1004 depicted and described in FIG. 10. Specifically, the B2BUA 1104 may include a separate dialog 1128a 1128b within a call session 1124 for each of the peers 1108. Similarly, the media server 1120 may maintain separate media channels 1136a, 1136b for each of the peers 1108 participating in the call. Control of the media channels 1136a, 1136b may be maintained by the B2BUA 1104 which is capable of establishing a control signal path 1140 with the media server 1120.

It should be noted that there can be any number of sequenced applications (B2BUAs) in the signaling between the shown B2BUA 1104 and the elements, A and B, as described above. The actual implementation of these network elements may vary. For example, either A or B, or both, may implement a SIP UA, SIP Stateful Proxy, or a B2BUA. They may have media engines of varying capabilities and capacity, each supporting one or multiple kinds of media types. As shown in FIG. 11, two call legs are instantiated to support the call session between A and B. The media session between A and B is shown to flow through a media server. The media session between A and B may consist of one or more media channels supporting RTP signals, and in the case of multiple media channels, some or all of the media channels associated with the call session may be terminated/relayed by the shown media server.

The topology shown in FIG. 11 is independent of the characteristics and directionality of the media channels 1136a, 1136b. Specifically:

1. If a B2BUA 1104 is able to monitor the status of all essential media channels 1136a, 1136b associated with a call session it controls, the B2BUA 1104 implements the recommendations provided herein. Otherwise, if any of the essential media channel 1136a, 1136b cannot be monitored (i.e., B2BUA-controller media engine is not engaged in providing media service to the essential channels of a call), the B2BUA 1104 implements one or more of the recommendations discussed above in connection with FIG. 10. Examples are as follows:
   a. If a B2BUA considers audio as essential media, and video as non-essential media, then if the media server controlled by the B2BUA can monitor the status of the audio channel, the B2BUA follows the recommendations provided in this section.
   b. If a B2BUA considers audio as an essential media, video as non-essential media, and the media server controlled by the B2BUA cannot monitor the status of the audio channel, the B2BUA follows the recommendations provided connection with FIG. 10. For example, in case of an audio and video call session, if the audio channel goes directly between network elements A and B, but the video goes through the media server 1120 (e.g., due to codec capabilities mismatch issues between A and B), then the B2BUA 1104 follows the recommendations discussed in connection with FIG. 10.

2. It is also possible that the number of media channels seen by peers A and B may differ. For example, peer A may have an audio channel with the media server 1120, but B, which is a multi-media device associated with a hearing impaired user, may have audio and video channels established with the media server 1120. In this case, it is possible for the media server to re-generate audio between peers A and B, and to introduce video between a 3rd party sign language source and peer B.

3. Media channels 1136a, 1136b may be bi-directional or uni-directional. The direction of the media associated with one call leg may be different from the direction of the media associated with the other call leg (e.g., held party listening to one-way music on hold stream or a one-way video stream, while the holding party's media session is inactive).

The approach to state analysis here is similar to the approach used in connection with the B2BUA 1004 depicted in FIG. 10, but the results will be slightly different because there is more independence between the two call legs since each one might negotiate media independently, subject to the ability of a commonly used media server 1120 to perform transcoding.

Each call leg of a media-terminating SIP B2BUA 1104 can be in "Normal", "Normal with some warnings" (NWSW), "Normal with Media Session Failure" (NWMSF), "Re-negotiating" (Re-neg), "Preserved", or "Call Termination" state, as shown in FIG. 2. The state of the call legs can be put into a table form (call state table), each row of the table representing different states the Call Leg 1 can be in, and each column of the table representing different states the Call Leg 2 can be in. The overall state of the call is dependent on the state of its two call legs.

The state table is defined to be symmetrical along the diagonal cells because the order of the states the call legs are in does not matter from connection preservation perspective. For example, one of the call legs may be in "Normal" state while the other call leg is in "Normal with some warnings" state. It makes no difference as to which of the two legs is in "Normal" state. As shown in Table 2, the diagonal cells show the state combinations where both call legs are in the same state. The call termination state is shown to span across the entire row and column of the table because once a call leg moves into the termination state, the entire call session is terminated.

An additional set of simplifications can be done to the state table by examining for different states the overall call session. It turns out that the overall call's state depends on the states of the call legs, and in some cases, the state of one of the call legs does not need to be the same state as the overall call state. For example, if any of the call legs is in Preserved state, the overall call is viewed as in the Preserved state. This is because, from state transition point of view, the only state the overall call can transition into is the Call Termination state, and the preservation specific action, such as starting the PIE Timer is taken when one of the call legs transitions into the Preserved state.

As shown in Table 2, the states that can be used in analyzing the connection preservation behavior of a media-terminating B2BUA 1104 are {A, B, C, D, E. F, J, K and L}. It should be noted that the "Re-negotiating" states, J, K, L and D, cannot be consolidated because the transitions in and out of "Re-negotiating" states is dependent on the state of both call legs. For example, if Call Leg 1 (CL1) is in "Re-negotiating" state and Call Leg 2 (CL2) is in "Normal" state, when CL1 renegotiation completes, the transition from J to A happens. If CL2 is in NWMSF and CL1 re-negotiation successfully completes, the transition happens from L to C.

TABLE 2

Call States for 2-party call using a media-controlling B2BUA

| | CL2 | | | | | |
|---|---|---|---|---|---|---|
| CL1 | Normal | NWSW | NWMSF | Re-neg | Preserved | Call Term |
| Normal | A | | | J | | |
| NWSW | | B | | K | | |
| NWMSF | | | C | L | | |
| Re-neg | J | K | L | D | | |
| Preserved | | | | | E | |
| Call Term | | | | | | F |

Based on the simplified state table shown in Table 8, the following connection preservation recommendations can be done for a media-controlling B2B UA:

1. The connection preservation logic maintains separate information for each media channel. Whenever a given media channel 1136a, 1136b changes state, each channel's state is analyzed to determine the new call session state.

2. When any of the call legs transitions into "Normal with some Media Warnings" (State B), the entire call session is considered to transition into this state. This is because the transitions out of this state are the same, independent of the number of call legs experiencing some media warnings. Specifically, the call session transitions to:
   a. Normal state (State A) when both call legs become healthy.
   b. Normal with Media Session Failure (State C) when any of the call legs experiences media session failure.
   c. Preserved state (State E) when any of the call legs experiences SIP session refresh timeout or 481 failure.
   d. Call Termination state (State F) when any of the call legs receives a BYE request.

3. When any of the call legs transitions into "Normal with Media Session Failure" (State C), the entire call session is considered to transition into this state. This is because the transitions out of this state are either to stay in one of the Normal states (if some or all media channels become healthy), or to the "Call Termination" state when a SIP session refresh timeout or 481 transaction failure is encountered at any of the call legs.

4. When one of the call legs transitions into the Preserved state (State E), due to session refresh timeout, or receipt of 481 to a re-INVITE/UPDATE request, the PIE Timer, if not already running, is started, and the entire call session is considered to have transitioned into the Preserved state. The transition into the Preserved state is a one-way transition such that once such transition occurs; the only way to move out of the "Preserved" state is into the "Call Termination" state (State F). This transition happens when the PIE Timer expires, or when SIP BYE request or AMC_F failure event is received for any of the two call legs.

5. Upon entry to the "Call Termination" state (State F), dialog resources associated with both call legs are cleaned up, and the media resources associated with both call legs are ended.

6. When one of the call legs transitions into the "Re-negotiating" state, the state of the other call leg affects the overall call states. When one cal leg is in "Re-negotiating" state, the other call leg can be in "Normal", "Normal with some warnings", "Normal with media session failure", or "Re-negotiating" state. The following state transitions can occur when any of the call legs is in Re-negotiating state:
   a. If re-negotiation (re-INVITE) fails due to receipt of SIP 481 error, the entire call session transitions to the "Preserved" state, as can be seen in transitions J->E, K->E, L->E, D->E.
   b. If re-negotiation that was taking place for a single call leg succeeds, the overall call transitions back to any of the Normal states, A, B, or C, depending on the state of the other call leg. The call leg at which re-negotiation took place transitions back to Normal state, as shown in FIG. 2.
   c. If re-negotiations that were taking place for both call legs succeed, the overall call transitions back to Normal State (State A). This is because any media warning or failure condition associated with both call legs is reset when the call comes out of a re-negotiation, as re-negotiation may have been done to resolve a previous media issue. In this case, starting from clean media state allows the overall call session to be in healthy state. If media connection issues persist, then the call session eventually transitions from A to B or C.
   d. If a BYE is received on any of the call legs while the call is in "Re-negotiating" state (States J, K, L or D), the call session is terminated.

In accordance with at least some embodiments of the present invention, a UA may be used to handle conference calls of N-parties. An N-party call involves multiple participants where each participant is represented by a SIP UA. While a typical call must have more than two participants to be classified as an N-party call, in case of a conference call with a conference server, N could be as small as one (e.g., a single participant connected to a conference bridge).

While there are models representing different kinds of N-party calls, from the call-preservation recommendation perspective, there are three models of multi-party calls. It turns out that the recommendations for the three types of multi-party calls follow the recommendations provided above.

As one example, an end application or network element 104 can provide multi-party call session support (e.g., local conferencing done by a SIP telephone). In this case, the connection preservation for each call leg is done independent from the other call leg as long as the overall call session has three or more participants. Therefore, the UA follows the recommendations described in connection with FIGS. 3-9 for each of the call legs, independently from one another.

As another example, a B2BUA may provide various conferencing type features that take in a two-party call, and turn it into a multi-party call. Examples of such features are ad hoc conferencing, bridging, whisper, etc. From this perspective, a call session may dynamically be associated with independent individual call legs (in case of multi-party call), or two call legs associated with a call session (in case of a 2-party call). In addition, the B2BUA may or may not be able to monitor the status of the essential media channels associated with the call. Therefore, any of the recommendations described above are applicable to a B2BUA-controlled multi-party call.

As yet another example, each call leg of a multi party call is between a far-end party and a conference server with a SIP 'focus' model. From the connection preservation perspective, each call leg can be viewed as independent from one another. Therefore, the UA follows the recommendations described in connection with FIGS. 3-9 for each of the call legs, independently from one another.

Figure 12:
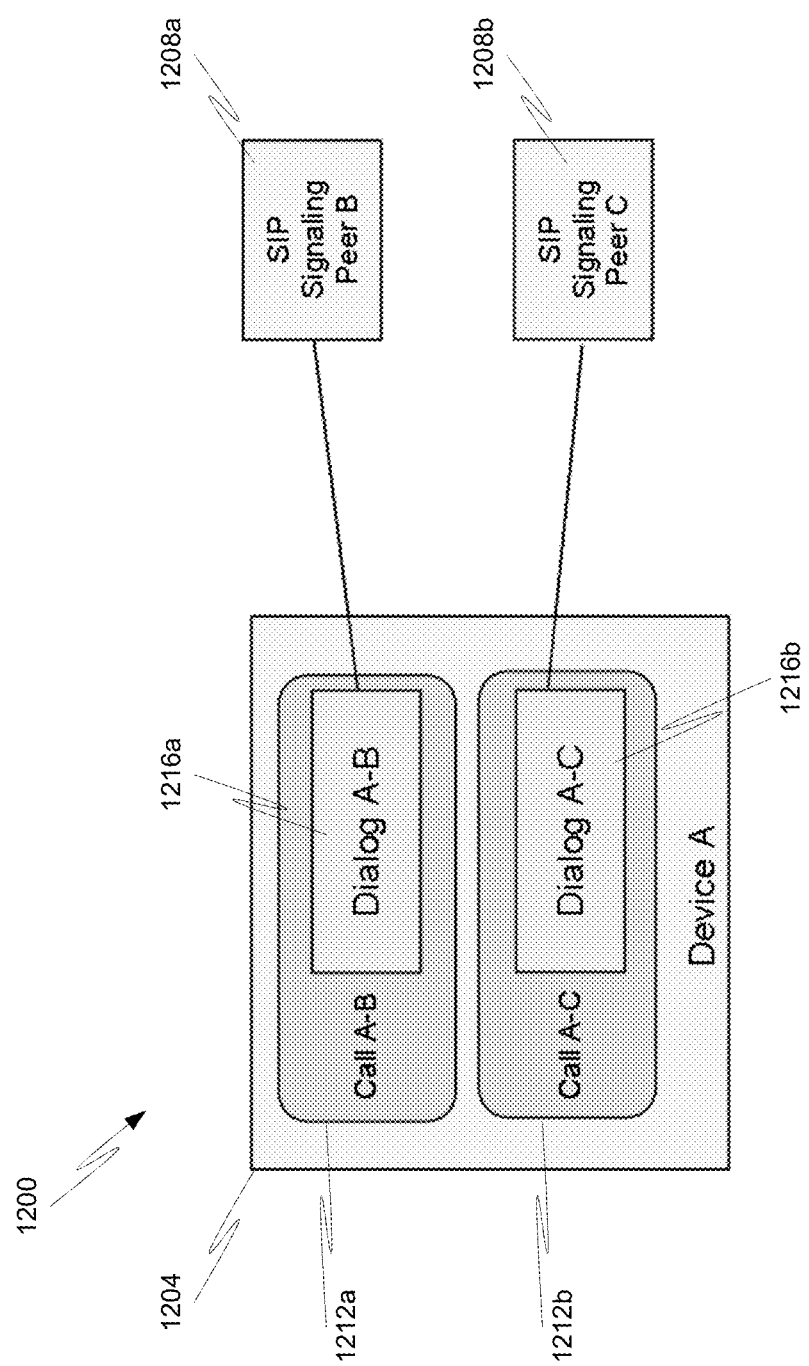
FIG. 12 is a block diagram of a user endpoint capable of initiating multiple calls to create a conference in accordance with at least some embodiments of the present invention.

Referring now to FIG. 12, a system 1200 used for endpoint control and mixing is depicted in accordance with at least some embodiments of the present invention. In this model, a user initiates multiple calls from a single device 1204. While the device 1204 maintains separate SIP calls signaling peers 1212a and 1212b, media is mixed locally at 1204, to accomplish an N-party conversation.

A SIP device 1204 is participating in two separate and disjoint dialogs 1216a, 1216b. The call 1212a between device A 1204 and device B 1208a is entirely separate from the call between device A 1204 and device C 1208b. Both the calls 1212a, 1212b have unique call-ids and tags. There are no SIP headers or extensions for peer B 1208a and peer C 1208b to learn about each other. For them, each is participating in a regular call with peer A 1204.

Despite mixing the media among separate calls 1212a, 1212b, the mixing device 1204 maintains independent relationship with its peers 1208a, 1208b at the signaling (SIP dialog) and media channel level. In this scenario, the device 1204 maintains an independent UA state machine for each SIP dialog 1216a, 1216b and associated media channel. The call preservation recommendations outlined for UAs discussed in connection with FIGS. 3-9 applies for each call 1212a, 1212b.

Figure 13:
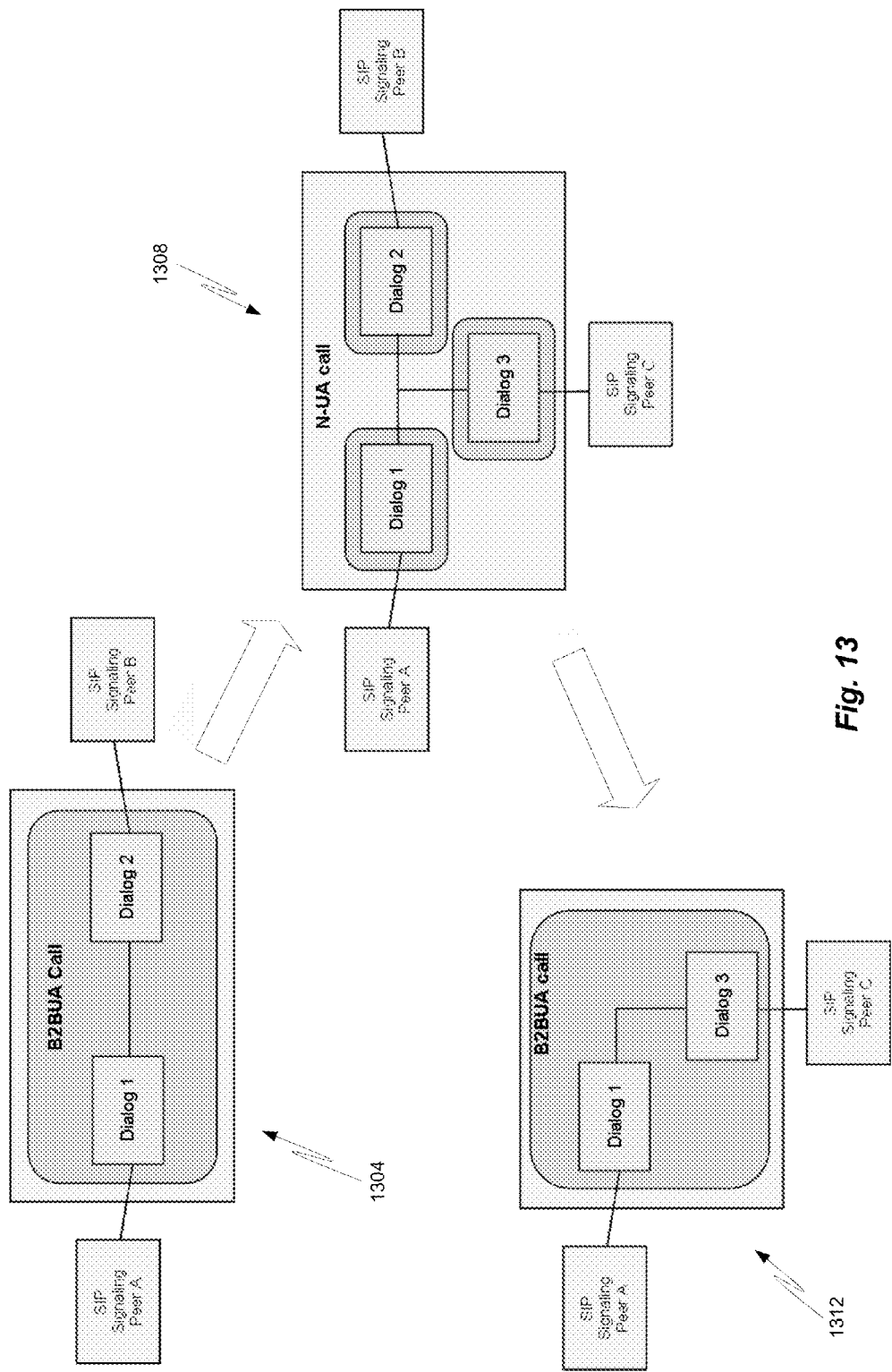
FIG. 13 is a block diagram depicting state transitions between two-party calls an N-party calls in accordance with at least some embodiments of the present invention.

With reference to FIG. 13, a diagram depicting the transition of a call from a two-party call to an N-party call, and back, will be discussed in accordance with at least some embodiments of the present invention. In this embodiment, a central application controls the communication between two SIP entities as a B2BUA entity between them. The B2BUA approach gives the application ability to split the call and provide independent experience to either party. It also gives it the ability to insert one or more participants in the existing call without reestablishing the entire call. Initially, the call may be in a first state 1304 where only two parties are involved in the call. The call may then transition to a second state 1308. For instance, a B2BUA application, on receiving a Third Party Call Control (3PCC) request, end user request, or an application logic request, may split the B2BUA call and insert additional participants. To achieve this, the B2BUA application may put one party on hold while connecting the other party with new participants. It may also elevate the regular two-party (B2BUA) call to an N-party (n-UA) call where it maintains independent relationship with n endpoints. Conversely, it may drop the N-party call to a regular two-party call as the participants exit, thereby causing the call to move to a third state 1312, which may be similar or identical to the first state 1304.

This type of application brings unique concerns to the connection preservation of the calls. Depending upon the change in the number of parties, the call may drift between a B2BUA model and n-UA model intermittently.

When there are two parties in the call (either because of a new call or (n–2) parties exiting from an N-party call), the B2BUA connection preservation recommendations outlined with respect to FIGS. 10 and 11 may be followed. While there are two parties in the call, the application can maintain a B2BUA state machine for the connection preservation.

As the call elevates to N-party call, the application must maintain n independent state machines for each dialog as outlined in the discussion of FIGS. 3-9. The application may drop the B2BUA connection-preservation state machine in this mode.

Figure 14:
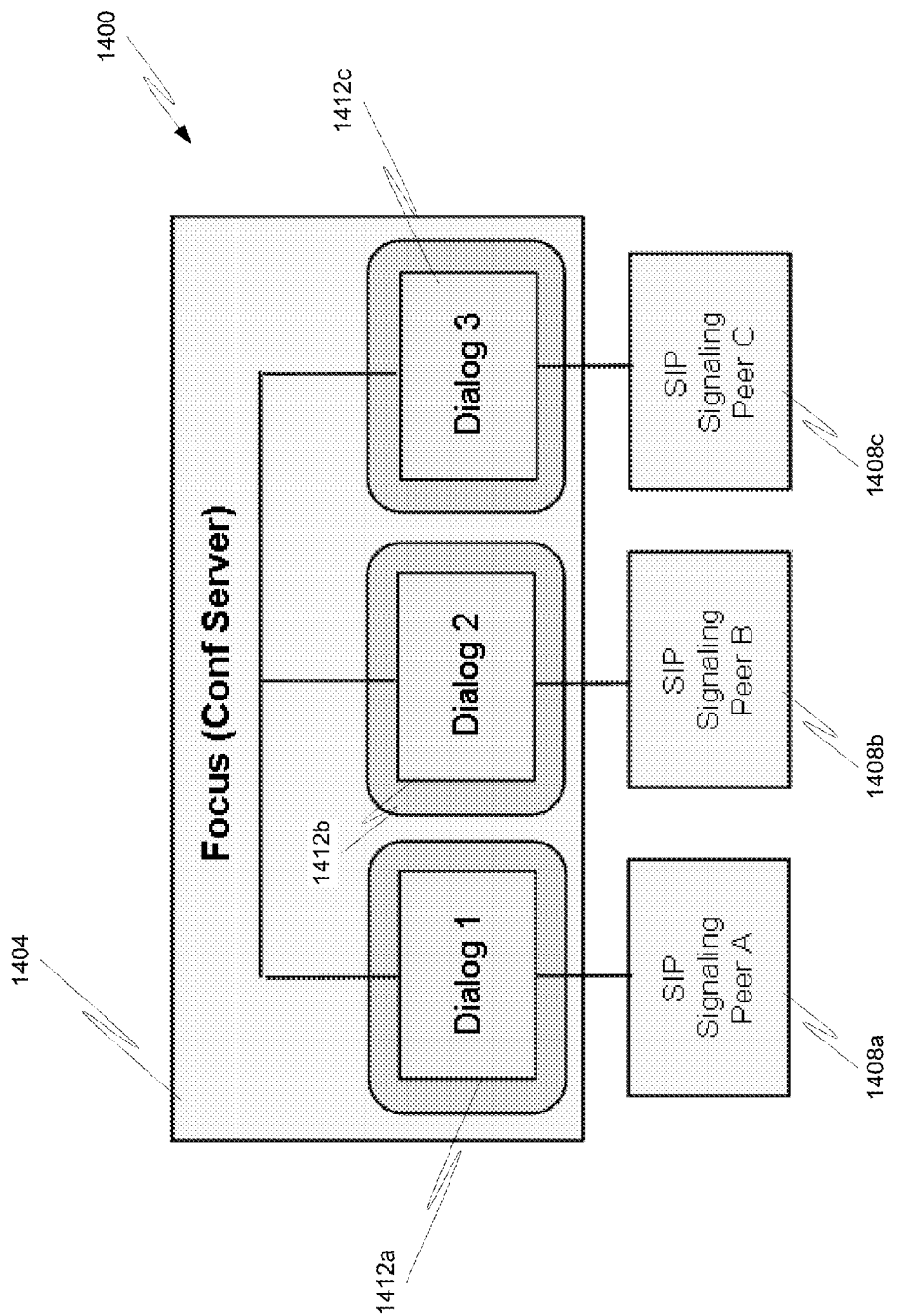
FIG. 14 is a block diagram depicting a conference server in accordance with at least some embodiments of the present invention.

Referring now to FIG. 14, a communication system 1400 including a conference server 1404 with a SIP 'focus' model will be described in accordance with at least some embodiments of the present invention. In accordance with at least some embodiments of the present invention, there is a single user agent 1404, referred to as a focus, which maintains independent dialog 1412a, 1412b, 1412c and relationship with each conference participant 1408a, 1408b, 1408c, respectively. Focus 1404 plays the role of a centralized manager of the conference. It handles the requests from participants based on the conference application policies and logic. The participants are unaware of other participants at the SIP dialog level (i.e., the inclusion or dropping of additional parties do not impact existing dialogs between focus and participants). It should be noted, however, that participants may use out of dialog mechanisms, such as subscription to a conference event package, to learn about other participants. At the SIP dialog level, each participant maintains an individual dialog with the focus 1404.

In accordance with at least some embodiments of the present invention, a conference server 1404 may have one or more independent dialogs with the participants. The health of each dialog is independent and does not influence other participants or overall conference. The server 1404 can maintain n independent connection-preservation state machines for each dialog and manage the states therein as outlined in the discussion of FIGS. 3-9.

In accordance with at least some embodiments of the present invention, stateful proxies may be adapted to cache information about the INVITE-based dialogs that they support, and therefore should monitor the SIP session refresh activity on these dialogs. When a stateful proxy detects that a SIP dialog has either experienced SIP session refresh timeout or received a 481 SIP session failure, it should start the PIE Timer. The resources associated with the dialog should not be cleaned until the PIE timer expires or BYE is received for that dialog.

It should be noted that one reason for utilizing a stateful proxy to implement the PIE Timer is to make sure that when a connection restoration technique is implemented in the future, a proxy's implementation does not pre-maturely end the chance of restoring a call session after the session refresh timeout occurs.

While the above-described flowcharts and state diagrams have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. The system can also be implemented by physically incorporating the system and/or method into a software and/or hardware system, such as the hardware and software systems of a communications device or system.

It is therefore apparent that there has been provided, in accordance with embodiments of the present invention, systems, apparatuses and methods for enhancing call preservation techniques. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method of managing a Session Initiation Protocol (SIP) call between two or more network elements, the method comprising:
reporting, by a media subsystem to a media control policy element, connection status information of one or more media channels established between two or more network elements, the connection status information indicating at least one of a media channel failure state and a media channel normal state;
determining that a communications-disrupting event has occurred during the SIP call; and based on the communications-disrupting event and the reported connection status information, causing the call to enter a connection preserved state, wherein, while in a connection preserved state, media resources assigned to the SIP call to support communications between the two or more network elements and media resources, continue to be assigned to the SIP call even though the communications-disrupting event has occurred.

2. The method of claim 1, wherein media continues to flow between the two or more network elements over at least one media channel established between the two or more network elements and wherein the communications-disrupting event comprises one or more of the following: (i) losing SIP signaling between the two or more network elements; (ii) a SIP session refresh interval expiring without completion of a successful refresh; and (iii) receiving a 481 response for an in-dialog SIP transaction.

3. The method of claim 1, wherein the media resources assigned to the SIP call are used to establish the at least one media channel between the two or more network elements and wherein the media resources include one or more of a media subsystem and a software module that acts as a termination point for the at least one media channel.

4. The method of claim 3, further comprising:
maintaining SIP state information for the SIP call even though the SIP call is in a connection preserved state.

5. The method of claim 1, wherein first and second media channels are established between the two or more network elements as part of the SIP call.

6. The method of claim 5, further comprising:
determining that the first media channel has experienced a failure, wherein the communications-disrupting event includes the failure of the first media channel; and
analyzing policy rules related to one or more of a priority and necessity of the first and second media channels in connection with maintaining the SIP call.

7. The method of claim 6, further comprising:
based on the analysis of the policy rules, determining that the first media channel is a necessity of the SIP call; and
in response to determining that the first media channel is a necessity of the SIP call, terminating the SIP call.

8. The method of claim 6, further comprising:
based on the analysis of the policy rules, determining that the first media channel is not a necessity of the SIP call; and
in response to determining that the first media channel is not a necessity of the SIP call, maintaining the SIP call in the preserved state.

9. The method of claim 1, while the SIP call is in the preserved state the two or more network elements are adapted to perform one of the following actions: (i) receive an in-dialog BYE request and in response to receiving such a request terminate a dialog preserved for the SIP call and (ii) receive an incoming out-of-dialog termination request that identifies a preserved dialog as a new target dialog and transfer the preserved dialog.

10. The method of claim 1, wherein a first of the two or more network elements is an end-user device.

11. The method of claim 10, wherein a second of the two or more network elements is at least one of a server, application, and B2BUA.

12. The method of claim 10, wherein a second of the two or more network elements is a media server and a third of the two or more network elements is a B2BUA configured to control the media server, wherein a media channel is established between the media server and the first of the end-user device and wherein a call control channel is established between the B2BUA and the end-user device.

13. The method of claim 1, wherein first and second media channels are established between the two or more network elements as part of the SIP call, the method further comprising:
determining that the first media channel has experienced a failure, wherein the communications-disrupting event includes the failure of the first media channel;
analyzing policy rules related to one or more of a priority and necessity of the first and second media channels in connection with maintaining the SIP call;
based on the analysis of the policy rules, determining whether the first media channel is a necessity of the SIP call;
in response to determining that the first media channel is a necessity of the SIP call, terminating the SIP call; and
in response to determining that the first media channel is not a necessity of the SIP call, maintaining the SIP call in the preserved state.

14. A SIP communication system, comprising:
a first network element comprising a first set of media resources;
a second network element comprising a second set of media resources, the second network element engaged in a Session Initiation Protocol (SIP) call with the first network element, wherein, as part of the SIP call, one or more media channels are established between the first and second network elements via the first and second sets of media resources;
wherein the first and second sets of media resources further comprise at least one media subsystem and at least one media control policy element, wherein the at least one media subsystem reports to the at least one media control policy element connection status information of the one or more media channels established between the first and second network elements, the connection status information indicating at least one of a media channel failure state and a media channel normal state, and wherein the SIP call enters a connection preserved state based on the reported connection status information and occurrence of a communications-disrupting event; and
wherein the first and second set of media resources assigned to the SIP call support communications between the first and second network elements and wherein the first and second sets of media resources continue to be assigned to the SIP call while the SIP call is in a connection preserved state even when a communications-disrupting event has occurred.

15. The system of claim 14, wherein media continues to flow between the first and second network elements over the media channel even when the connection is in a preserved state and wherein the communications-disrupting event comprises one or more of the following: (i) losing SIP signaling between the two or more network elements; (ii) a SIP session refresh interval expiring without completion of a successful refresh; and (iii) receiving a 481 response for an in-dialog SIP transaction.

16. The system of claim 14, wherein the first and second set of media resources include one or more of a media subsystem and a software module that acts as a termination point for the media channel.

17. The system of claim 16, wherein first and second media channels are established between the first and second network elements as part of the SIP call.

18. The system of claim 17, wherein the first media channel comprises one or more of an audio channel, video channel, and data channel and wherein the second media channel also comprises one or more of an audio channel, video channel, and data channel, the system further comprising a media control policy element configured to handle an outage of the first media channel differently than an outage of the second media channel.

19. The system of claim 14, wherein the first network element is an end-user device.

20. The system of claim 19, wherein the second network element is at least one of an end-user device, server, application, and B2BUA.

* * * * *